No. 649,343. Patented May 8, 1900.
J. NOBLE.
FENCE WIRE STRINGER.
(Application filed Jan. 3, 1900.)

(No Model.)

WITNESSES:
INVENTOR
John Noble
ATTORNEYS

UNITED STATES PATENT OFFICE.

JOHN NOBLE, OF EDWARDS, NEW YORK.

FENCE-WIRE STRINGER.

SPECIFICATION forming part of Letters Patent No. 649,343, dated May 8, 1900.

Application filed January 3, 1900. Serial No. 242. (No model.)

*To all whom it may concern:*

Be it known that I, JOHN NOBLE, a citizen of the United States, and a resident of Edwards, in the county of St. Lawrence and State of New York, have invented a new and Improved Fence-Wire Stringer, of which the following is a full, clear, and exact description.

One object of this invention is to provide a device by means of which fence-wire may be strung or fed from a spool as needed upon any character of ground, the services of only a single operator being required.

Another object of the invention is to so construct the device that it may be operated wherever a single individual can find a passage and so that the device may be advantageously employed for rereeling or rewinding wire of any description when, for example, a wire fence is to be taken down.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in both figures.

Figure 1:
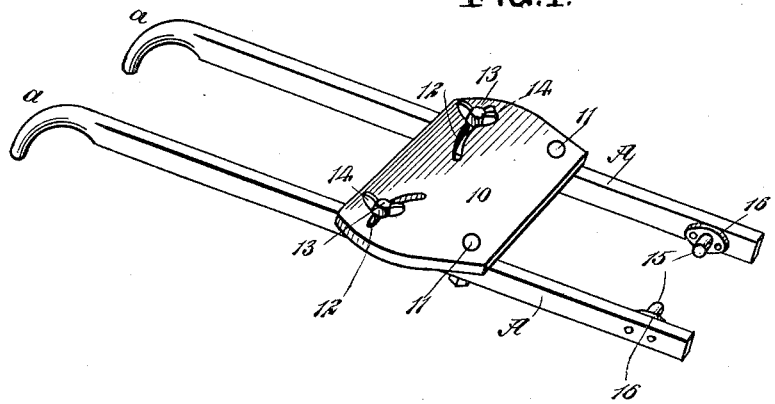
Figure 2:
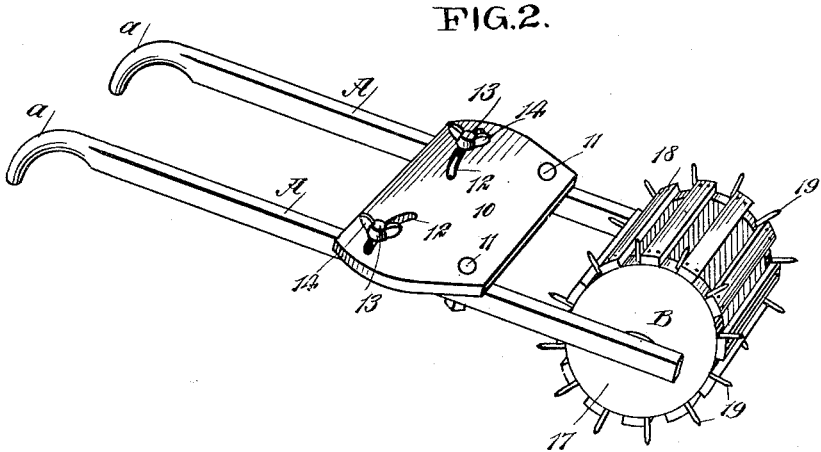

Figure 1 is a perspective view of the improved device, the reel being omitted; and Fig. 2 is a perspective view of the improved device, having a reel located therein especially adapted for receiving wire to be rewound.

The frame of the device consists of two parallel side bars A, which side bars terminate at one end in suitable handles $a$ and a connecting platform or bar 10, which platform or connecting-bar is pivotally attached to each of the side bars or beams A by means of suitable bolts or pins 11, which pins or bolts 11 are preferably located one near each end of the platform or cross-bar, near one edge of the same. The platform or cross-bar 10 is further provided near its other edge at each end with a curved slot 12, the inner ends of the two slots being carried on in direction of the center of the cross-bar or platform. A pin or a bolt 13 is secured to each of the side beams or bars A, and these pins or bolts are threaded at their upper ends and extend through the curved slots 12, being provided at their upper ends with nuts 14, preferably wing-nuts. Thus by loosening the nuts 14 the ends of the side bars or beams A may be separated or brought together, as may be desired, and upon tightening the thumb-nuts 14 the side bars or beams A will be held in their adjusted position.

On the inner face of each side bar or beam A, near the end opposite that having the handle, short spindles 15 are secured, preferably through the medium of suitable plates 16, to which the spindles are attached. These spindles 15 are in transverse alinement and face one another, as shown in Fig. 1. When wire is to be strung, the spindles 15 are made to enter the heads of the reel on which the wire is wound, and when a single operator grasps the handles $a$ of the device and walks away from the object to which the wire is attached the wire will unwind, the reel rolling on the ground and serving as a wheel, thus permitting the device to be operated with but little exertion. When the wire is to be rewound or rereeled, a reel B is preferably used, such as is shown in Fig. 2, the reel consisting of heads 17, connected by slats 18, and spikes 19 radiate from the peripheries of the said heads, which spikes enter the ground during the process of rereeling or rewinding the wire. The reel B is received between the side bars or beams A of the device in the same manner as the reel upon which the wire is marketed.

When the device is used for rewinding or rereeling the wire, it is pushed toward the object from which the wire is loosened or removed, and the spikes 19 prevent the reel B from slipping on the ground while receiving the unstrung wire, insuring the wire being compactly wound on the reel. If barbs are used on the wire, the barbs act, in conjunction with the spikes 19, to prevent the reel from slipping.

Having thus described my invention, I claim as new and desire to secure by Letters Patent—

A device for stringing and rewinding wire, comprising two side bars, spindles attached to the front ends of the side bars and projecting laterally toward each other to carry a wire-reel, a platform provided with pins on which the side bars are respectively pivoted so that the spindles may be moved toward and from each other, the platform being provided with slots therein respectively concentric to the pins, bolts fastened to the respective side bars and projecting through the slots in the platform, and nuts attached to the bolts and adapted to engage the platform to hold the side bars relatively rigid.

In testimony whereof I have signed my name to this specification in the presence of two subscribing witnesses.

JOHN NOBLE.

Witnesses:
W. E. GALE,
E. A. SHEFFNER.